United States Patent [19]

Beall et al.

[11] 4,118,237

[45] Oct. 3, 1978

[54] GLASS-CERAMICS DISPLAYING INHERENT LUBRICITY

[75] Inventors: George H. Beall, Big Flats; Kenneth Chyung, Painted Post; Syed N. Hoda, Horseheads, all of N.Y.

[73] Assignee: Corning Glass Works, Corning, N.Y.

[21] Appl. No.: 821,692

[22] Filed: Aug. 4, 1977

[51] Int. Cl.$^2$ .......................... C03B 32/00; C03C 3/22
[52] U.S. Cl. ........................ 106/39.6; 65/33; 106/39.7; 106/39.8
[58] Field of Search .................. 65/33; 106/39.6, 39.7, 106/39.8

[56] References Cited

U.S. PATENT DOCUMENTS

| | | | |
|---|---|---|---|
| 3,801,295 | 4/1974 | Beal et al. | 65/33 |
| 3,905,824 | 9/1975 | Grossman | 65/33 X |
| 3,939,056 | 10/1974 | Grossman | 106/39.7 |
| 3,985,531 | 10/1976 | Grossman | 65/33 |
| 3,985,534 | 12/1976 | Flannery et al. | 106/39.7 |
| 4,018,612 | 4/1977 | Chyung | 106/39.7 |
| 4,063,955 | 12/1977 | Fritsch et al. | 106/39.6 |

*Primary Examiner*—S. Leon Bashore
*Assistant Examiner*—Frank W. Miga
*Attorney, Agent, or Firm*—Clinton S. Janes, Jr.; Clarence R. Patty, Jr.

[57] ABSTRACT

The instant invention is related to the production of glass-ceramic articles which exhibit a hydrophobic character and an inherent tactile quality of being slippery or oily to the touch. Such articles are dervived from compositions within the MgO—Al$_2$O$_3$—SiO$_2$—F quaternary and contain the humite mineral norbergite (Mg$_2$SiO$_4$ · MgF$_2$) as a major crystal phase. The intrinsic hydrophobic character and lubricity of the inventive compositions recommend their utility in such applications as (1) high temperature bearing or other low friction mechanical devices, an (2) non-sticking and easily-cleaned culinary ware.

4 Claims, No Drawings

GLASS-CERAMICS DISPLAYING INHERENT LUBRICITY

BACKGROUND OF THE INVENTION

Glass-ceramic articles are prepared through the controlled crystallization in situ of parent or precursor glass articles. Hence, the manufacture of glass-ceramic articles comprises three general steps. First, a batch of ingredients in the proper proportions (customarily including a nucleating agent) is compounded and melted. Second, the melt is simultaneously cooled to a glass essentially free from crystallization and an article of a desired geometry shaped therefrom. Third, the glass article is exposed to a heat treatment at temperatures above the transformation range thereof to cause the in situ growth of crystals. Commonly, this heat treatment is divided into two steps. Thus, the glass article will first be heated to a temperature within or slightly above the transformation range to develop nuclei therein, after which the article will be heated to a considerably higher temperature, frequently in excess of the softening point of the glass, to cause the growth of crystals on the nuclei.

Inasmuch as the crystallization process contemplates the essentially simultaneous growth of crystals on countless nuclei dispersed throughout the precursor glass article, the microstructure of a glass-ceramic article customarily consists of relatively uniformly-sized, fine-grained crystals homogenously distributed, but randomly oriented, within a residual glassy matrix. Conventionally, the crystal phase constitutes the predominant proportion, i.e., greater than 50% by volume, of a glass-ceramic article. Such high crystallinity normally leads to glass-ceramic articles exhibiting chemical and physical properties quite different from those of the precursor glass body and more closely resembling those of the crystal phase. Furthermore, the residual glassy matrix will be small in amount and of a very different composition from that of the parent glass, since the constituents making up the crystal phase will have been removed therefrom during the crystallization process. Finally, the presence of a residual glassy matrix renders the glass-ceramic article free of voids and non-porous.

U.S. Pat. No. 2,920,971, the basic patent in the area of glass-ceramics, provides an extensive discussion of the mechanism of crystal growth and the practical considerations involved in the manufacture of glass-ceramic articles. Reference is made to the patent for a general understanding that the crystal phases developed in glass-ceramic articles and the amount of such crystallinity are dependent upon the parent glass composition and the heat treatment parameters to which the parent glass is exposed.

SUMMARY OF THE INVENTION

The present invention is grounded in the discovery of a new family of glass-ceramic articles which manifests hydrophobic behavior and an oily or a slippery feel to the touch, while exhibiting a very low coefficient of friction and wear constant. Operable compositions for such articles consist essentially, by weight on the oxide basis, of about 12-40% MgO, 3-15% $Al_2O_3$, 35-55% $SiO_2$, and 5-15% F. Up to about 25% total of various modifying oxides can be incorporated in the base compositions. Such oxides include BaO, CaO, $Fe_2O_3$, $K_2O$, MnO, $Na_2O$, PbO, $Bi_2O_3$, and SrO. In general, modifying oxides which tend to produce mica, e.g., $K_2O$, $Na_2O$, SrO, and BaO, will preferably be held below about 5%. However, CaO and PbO may be present in individual amounts up to 20%, and MnO, $Bi_2O_3$, and $Fe_2O_3$ in individual amounts up to 15%. Network formers such as $B_2O_3$ and/or $P_2O_5$ may be present in amounts up to about 10%.

The property of lubricity appears to be associated with the humite mineral norbergite ($Mg_2SiO_4 \cdot MgF_2$), inasmuch as glass-ceramic articles containing such crystals as the major phase display that characteristic. Chondrodite ($2Mg_2SiO_4 \cdot MgF_2$) is, perhaps, the basic member of the humite minerals, but it is well-recognized that a number of ions can replace $Mg^{+2}$ ions in the octahedral position of the humite and structurally-related olivine group minerals. The incorporation of such ions in the glass-ceramic composition can accentuate the quality of lubricity exhibited by the final product. Especially effective for that purpose are the ions $Pb^{+2}$, $Sr^{+2}$, $Ca^{+2}$, $Mn^{+2}$, and $Fe^{+2}$.

The inclusion of a nucleating agent in the compositions is not necessary, although the addition of such conventional nucleating agents as $TiO_2$, $ZrO_2$, and $SnO_2$ does not appear to adversely affect the properties of the final product. Whereas the crystallization mechanism operating in the inventive compositions is not thoroughly understood, it is believed that the crystallization process involves two steps. First, fluoride-containing crystallites (probably $MgF_2$-sellaite) develop at temperatures about and somewhat above the transformation range of the parent glass. Second, upon further heating, the humite-type crystals grow on those nuclei.

The method of the invention comprises three general steps: (1) a batch of a predetermined composition is melted; (2) the melt is simultaneously cooled to a temperature at least below the transformation range of the glass and a glass article of a desired configuration shaped therefrom; and (3) the glass shape is heated to a temperature between about 850°-1150° C. for a sufficient length of time to achieve the in situ crystallization of norbergite-type crystals.

Because of the crystallization phenomenon is both time and temperature dependent, it can be appreciated that only brief dwell periods will be demanded where temperatures at the upper extreme of the crystallization range are employed; whereas, in the cooler extreme of the range, much longer exposure periods will be required. For example, as brief a period as 0.5 hour may be adequate at temperatures in the vicinity of 1150° C., but as long as 24 hours may be needed at the coolest extreme of the range.

The preferred crystallization heat treatment practice contemplates a two-step schedule. Thus, the precursor glass article is initially heated to a temperature somewhat above the transformation range thereof, i.e. about 750°-850° C., and maintained therewithin for a period of time adequate to assure good nucleation. Subsequently, the temperature is raised to about 850°-1150° C. and held therewithin for a sufficient period of time to complete substantial crystal growth. A nucleation period of about 1-6 hours followed by a crystallization hold for about 1-8 hours has been adjudged to constitute the most preferred embodiment.

It will be appreciated that no specific dwell period as such at any one temperature is required within the nucleation and crystallization ranges. However, to insure the desired high crystallinity of very fine-grained crystals, the precursor article will be retained within the prescribed temperature ranges for the stated times.

PRIOR ART

U.S. Pat. No. 3,801,295 describes the production of glass-ceramic articles wherein synthetic fluormica constitutes the predominant crystal phase. The microstructures of the articles consist of very large (>150 microns), essentially two-dimensional crystals of high aspect ratio distributed throughout the glass matrix. The presence of such easily cleavable flakes imparts excellent machineability, high fracture energy, and good thermal shock damage resistance.

That patent mentions the development of norbergite and mullite as preceding the formation of the desired fluormica crystals. The crystalline assemblage of norbergite and mullite transforms to fluormica as the heat treatment of the precursor glass is continued such that the microstructure and properties of the final product are far removed from those of the present inventive articles.

DESCRIPTION OF PREFERRED EMBODIMENTS

Table I lists compositions, expressed in terms of parts by weight on the oxide basis, which are operable in the instant invention. Since the sum of the individual components of the several examples totals or closely approximates 100, the examples can reasonably be deemed to be recited in weight percent. Also, because it is not known with which cation(s) the fluorine is combined, it is simply recorded as $MgF_2$, the batch ingredient employed to provide the fluoride content. It will be appreciated, of course, that other fluoride compounds would be equally useful as batch materials.

The batch ingredients, other than the fluoride component(s), can be any materials, either the oxides or other compounds, which, when melted together, will be converted into the desired oxide in the proper proportions. The batch ingredients were compounded, ball-milled together to assist in obtaining a homogeneous melt, and thereafter melted in closed platinum crucibles for about 4-6 hours in a furnace operating at about 1400°-1450° C. The melts were poured into steel molds to yield slabs about 6 × 6 inches × ½ inch and those slabs immediately transferred to an annealer operating at about 600°-650° C.

The loss of fluoride due to volatilization during the melting step is relatively low, ranging between about 10-25% by weight.

After annealing the glass slabs and inspecting them for glass quality, they were transferred to an electrically-fired furnace and there exposed to the heat treatment schedules listed in Table II. In each instance, the article was heated at about 200°-300° C./hour to the recited dwell temperatures. More rapid rates of heating are possible, particularly where formers or other physical supports are employed to inhibit deformation of the articles. However, that rate of heating avoided warpage or other body distortion throughout the entire operable composition range.

It should be observed that in these laboratory examples the glass slabs were cooled to room temperature to permit inspection of glass quality prior to being exposed to the crystallization step. However, that practice is not required for successful operability of the invention. Rather, the glass shapes can merely be cooled below the transformation range thereof and then immediately reheated to induce nucleation and crystallization.

Upon completion of the heat treatment schedules, the electric current to the furnace was cut off and the crystallized articles permitted to cool to room temperature within the furnace. This practice, undertaken as a matter of convenience only, has been termed "cooling at furnace rate". This mode of cooling has been estimated to be at a rate of about 200°-300° C./hour. The coefficient of thermal expansion for the crystallized articles over the range of 25°-300° C. averages between about 60-90 × $10^{-7}$/° C. Hence, more rapid rates of cooling are entirely feasible without hazarding cracking or spalling of the articles, particularly with relatively thin-walled articles.

Table II also records a visual description of the crystallized body, the crystal phases identified via X-ray diffraction analyses, listed in order of decreasing amount present, and measurements of static coefficient of friction and wear constants (x$10^{-6}$ gram/gram second) as determined via a modification of ASTM Designation D3028-72. The static coefficients of friction were measured at ambient temperatures (about 21°-24° C.) and relative humidities (about 50-58%) utilizing a 50 gram load. The wear constants were also measured at ambient temperatures and relative humidities with a 50 gram load employing a sliding speed of 300 cm/second. In each test, two pieces of the product were rubbed against each other.

Comparison tests were run utilizing three different articles: (1) a borosilicate glass, Corning Code 7740, sold under the trademark PYREX ® for laboratory glassware; (2) a glass-ceramic material, Corning Code 9608, sold under the trademark CORNING WARE ® for culinary ware; and (3) the precursor glass body before it was crystallized into the glass-ceramic Corning Code 9608. The approximate analyses in weight percent of Corning Code 7740 and Corning Code 9608 are recited below:

TABLE I

|  | 1 | 2 | 3 | 4 | 5 | 6 | 7 | 8 | 9 | 10 |
|---|---|---|---|---|---|---|---|---|---|---|
| $SiO_2$ | 41.7 | 46.1 | 41.0 | 41.0 | 41.8 | 39.9 | 45.0 | 39.2 | 39.2 | 42.9 |
| $Al_2O_3$ | 6.4 | 4.6 | 6.3 | 6.3 | 7.4 | 11.4 | 10.0 | 11.2 | 10.4 | 9.5 |
| $B_2O_3$ | 1.5 | 1.6 | 2.9 | 1.5 | 2.1 | — | — | — | 0.8 | — |
| MgO | 17.6 | 17.8 | 17.4 | 13.2 | 16.8 | 12.5 | 25.0 | 7.2 | 14.5 | 23.8 |
| $MgF_2$ | 13.9 | 14.8 | 13.6 | 20.5 | 13.6 | 14.9 | 20.0 | 14.4 | 13.9 | 19.0 |
| PbO | 18.9 | 15.1 | 18.6 | 18.6 | 17.0 | 12.4 | — | 12.1 | 21.2 | 4.8 |
| $TiO_2$ | — | — | — | — | 0.1 | — | — | 4.4 | — | — |
| $FeO_3$ | — | — | — | — | 1.0 | 8.9 | — | — | — | — |
| $K_2O$ | — | — | — | — | 0.2 | — | — | — | — | — |
| MnO | — | — | — | — | — | — | — | 11.6 | — | — |

|  | Code 7740 | Code 9608 |
|---|---|---|
| $SiO_2$ | 80.5% | 69.5% |
| $Na_2O$ | 3.8 | — |
| $K_2O$ | 0.4 | — |
| $B_2O_3$ | 12.9 | 0.07 |
| $Al_2O_3$ | 2.2 | 17.6 |
| $Li_2O$ | — | 2.7 |
| MgO | — | 2.6 |
| ZnO | — | 1.0 |
| $TiO_2$ | — | 4.7 |

-continued

|  | Code 7740 | Code 9608 |
|---|---|---|
| $As_2O_3$ | — | 0.9 |
| F | — | 0.03 |
| $Fe_2O_3$ | — | 0.06 |
| $MnO_2$ | — | 0.03 |
| $ZrO_2$ | — | 0.2 |

TABLE II

| Example No. | Heat Treatment | Visual Description | Crystal Phases | Coef. of Friction | Wear Constant |
|---|---|---|---|---|---|
| 1 | 800° C.-four hours 1050° C-four hours | Creamy yellow opaque, extremely fine-grained, very slippery | Norbergite | 0.16 | — |
| 2 | " | " | " | — | — |
| 3 | " | " | " | 0.36 | — |
| 4 | " | " | " | 0.18 | 0.06 |
| 5 | " | " | " | 0.31 | — |
| 6 | 800° C-4 hours 950° C-4 hours | Brown opaque, extremely fine-grained, very slippery, slightly sectile | Norbergite, lead mica, cristobalite, magnetite | 0.24 | — |
| 7 | " | Dark brown opaque, very fine-grained, slippery | Norbergite, mullite | 0.19 | 0.14 |
| 8 | 750° C-2 hours 950° C-2 hours | Light brown skin with gray beige interior, opaque, slightly slippery | Norbergite, lead mica | — | — |
| 9 | 800° C-4 hours 1050° C-4 hours | Creamy white opaque, very fine-grained, slightly slippery | Norbergite, lead mica | — | — |
| 10 | 750° C-2 hours 900° C-2 hours | Creamy yellow opaque, very fine-grained, very slippery | Norbergite, mullite, $MgF_2$ | 0.21 | — |
| 7740 Glass | None | Transparent clear glass | None | 0.38 | 38.8 |
| 9608 Glass | None | Transparent, amber-colored glass | None | 0.50 | 46.0 |
| 9608 | 800° C-½ hour 1120° C-1 hour | White opaque, fine-grained, not slippery | Beta-spodumene solid solution, rutile | 0.49 | 10.8 |

The heat treated products were highly crystalline, i.e., greater than 50% by volume and, in the majority of instances, about 50-75%. The crystals were very fine-grained, essentially all having diameters less than 2 microns with a large majority having diameters less than 1 micron.

An examination of Table II points out the lubricity inherent in the inventive products plus, very importantly, a very low wear constant, which clearly indicates the excellent resistance to wear demonstrated thereby. Thus. the inventive products exhibit a resistance to wear of at least about two orders of magnitude better than the "conventional" glass-ceramic, and even greater when compared with glass.

We claim:

1. A method for making a glass-ceramic article exhibiting the properties of lubricity and excellent resistance to wear and having a crystal content in excess of 50% by volume wherein norbergite constitutes the predominant crystal phase, which consists in the steps of:

(a) melting a batch for a glass consisting essentially, by weight on the oxide basis, of about 12-40% MgO, 3-15% $Al_2O_3$, 35-55% $SiO_2$, and 5-15% F, the sum of those four components constituting at least 75% by weight of the total composition;

(b) simultaneously cooling said melt to a temperature at least below the transformation range and shaping a glass article therefrom; and then (c) heating said glass article to a temperature between about 850°-1150° C. to cause the growth in situ of crystals.

2. A method according to claim 1 wherein said glass article is first heated to a temperature between about 750°-850° C. for about 1-6 hours to cause nucleation therein and thereafter heated to a temperature between about 850°-1150° C. for about 1-8 hours to effect the growth of crystals on said nuclei.

3. A method according to claim 1 wherein said crystals have diameters of less than about 2 microns.

4. A glass-ceramic article made in accordance with the method of claim 1.

* * * * *

UNITED STATES PATENT AND TRADEMARK OFFICE
CERTIFICATE OF CORRECTION

PATENT NO. : 4,118,237

DATED : October 3, 1978

INVENTOR(S) : George H. Beall, Kenneth Chyung, and Syed N. Hoda

It is certified that error appears in the above-identified patent and that said Letters Patent are hereby corrected as shown below:

Title Page, line 11 of the Abstract, "an" should be -- and --.

Column 2, line 40, after "crystals." insert -- [the transformation range has been defined as the temperature at which a liquid melt is considered to have been converted into an amorphous solid, that temperature generally being deemed as lying in the vicinity of the annealing point of the glass.] --.

Signed and Sealed this

Tenth Day of July 1979

[SEAL]

Attest:

Attesting Officer

LUTRELLE F. PARKER

Acting Commissioner of Patents and Trademarks